R. O. BERG.
MACHINE FOR SAWING METAL TUBING AND STEEL MOLDING.
APPLICATION FILED SEPT. 15, 1917.

1,262,436.

Patented Apr. 9, 1918.
2 SHEETS—SHEET 1.

INVENTOR
RICHARD O. BERG.
BY
Ralgemond A. Parker
ATTORNEY

R. O. BERG.
MACHINE FOR SAWING METAL TUBING AND STEEL MOLDING.
APPLICATION FILED SEPT. 15, 1917.

1,262,436.

Patented Apr. 9, 1918.
2 SHEETS—SHEET 2.

INVENTOR
RICHARD O. BERG.
BY
Ralzemond A. Parker
ATTORNEY

UNITED STATES PATENT OFFICE.

RICHARD O. BERG, OF DETROIT, MICHIGAN, ASSIGNOR TO MICHIGAN STEEL TUBE PRODUCTS CO., OF DETROIT, MICHIGAN, A CORPORATION OF MICHIGAN.

MACHINE FOR SAWING METAL TUBING AND STEEL MOLDING.

1,262,436.

Specification of Letters Patent.

Patented Apr. 9, 1918.

Application filed September 15, 1917. Serial No. 191,614.

*To all whom it may concern:*

Be it known that I, RICHARD O. BERG, a citizen of the United States, residing at Detroit, county of Wayne, State of Michigan, have invented a certain new and useful Improvement in Machines for Sawing Metal Tubing and Steel Molding, and declare the following to be a full, clear, and exact description of the same, such as will enable others skilled in the art to which it pertains to make and use the same, reference being had to the accompanying drawings, which form a part of this specification.

This invention relates to machines for sawing metal tubing and steel molding, and has for its object a machine with the power, saw and transmission so arranged that the saw may be quickly and easily brought against the work and the entire outfit may be run around to places where it is needed by reason of the stacking of the tubing.

In the drawings,—

In the manufacture of tubing the same is piled in stacks of tubes of considerable length. It is desirable to saw these up in convenient lengths for either handling or forming into the uses for which the tubing is intended. Inasmuch as this long tubing is very heavy it is desirable to have the means for sawing it close at hand. To afford this means I have designed a saw to which the power, the transmission and the saw itself are arranged so that they can not only be conveniently carried upon a truck but the saw is tiltable against the work.

Figures 1, 2:
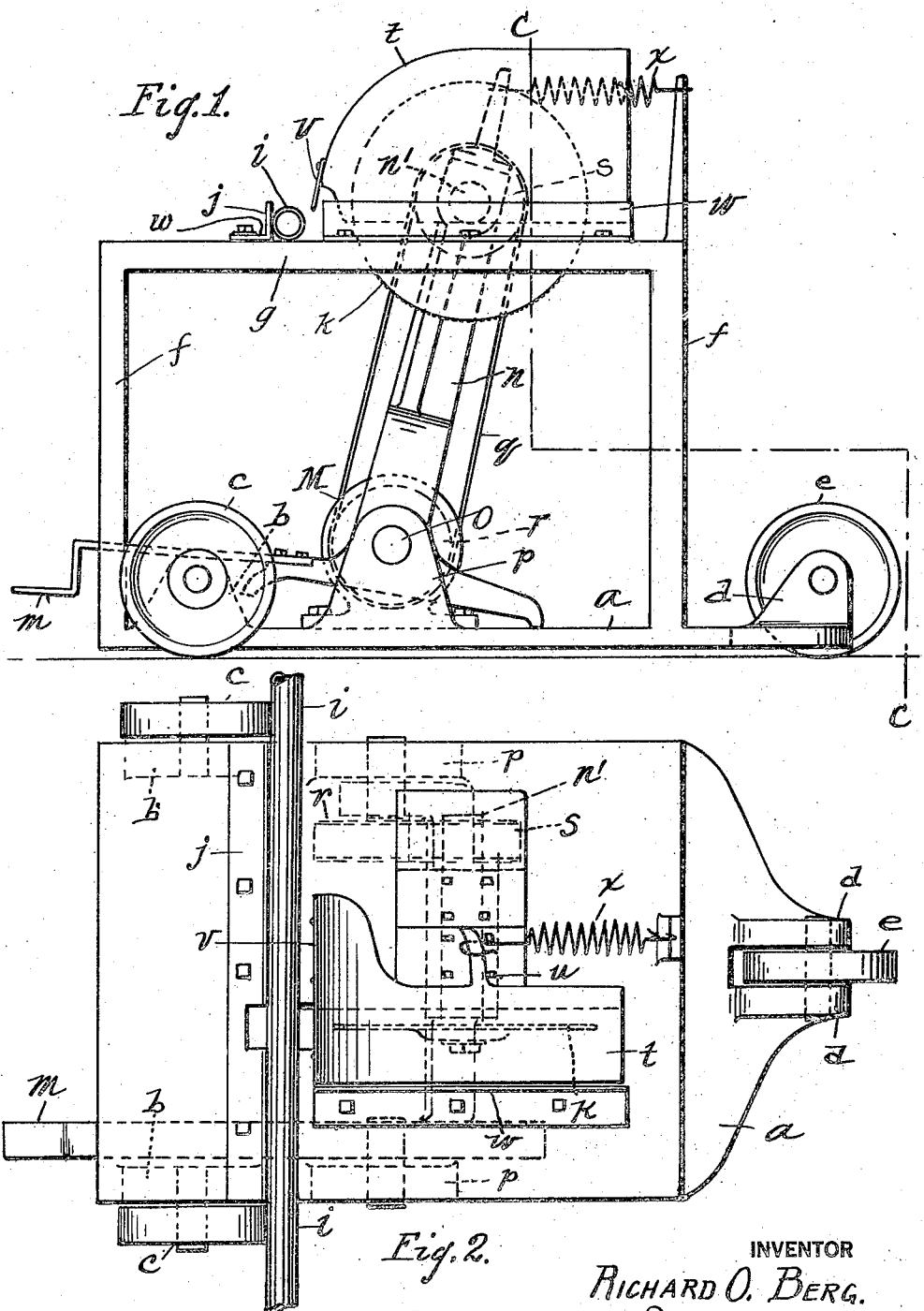
Figure 1 is a side elevation of the truck carrying the saw.
Fig. 2 is a top plan view of the same.
Figure 3:
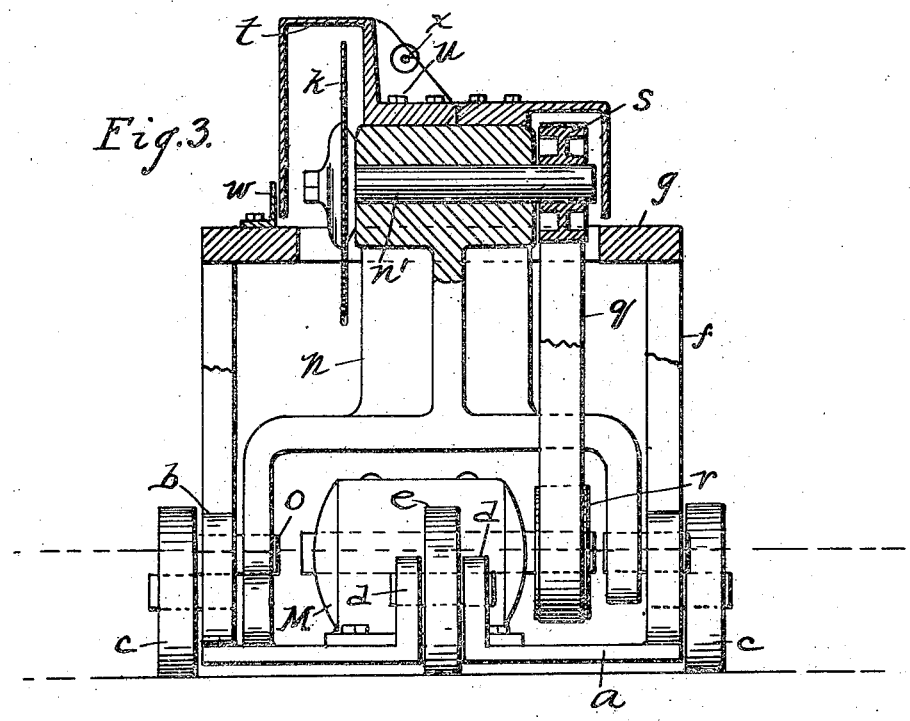
Fig. 3 is a rear elevation.
Figure 4:
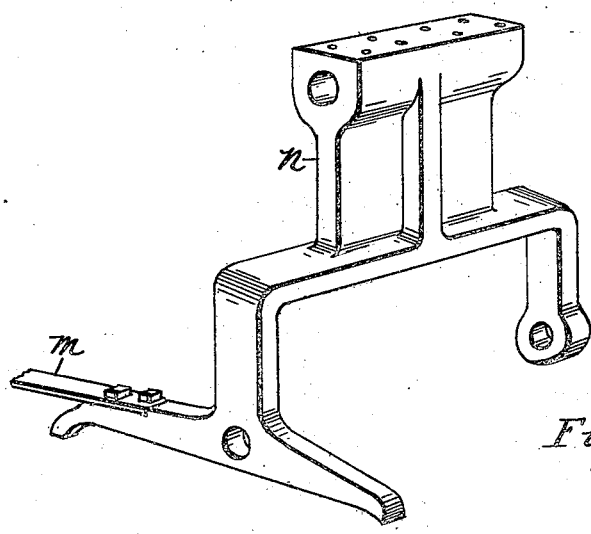
Fig. 4 is a perspective of the tiltable saw-carrier.

*a* is a truck which is provided with upstanding lugs *b* where are journaled the truck wheels *c, c* at the front and a pair of lugs *d, d* which journal the single truck wheel *e* at the back. This truck is provided with uprights at the rear and front designated *f* which supports a bed *g* over which the tubing *i* is drawn, laid and measured off. The angle iron guide *j* is bolted to the top of the bed and the tubing *i* can be laid against this angle iron guide. When the proper length has been measured off, the saw *k* may be brought into contact with the tubing by the operator pressing down on the pedal lever *m* which is attached to the yoke-like saw-carrier *n* (shown in perspective, Fig. 4). This upper end is in the form of a block forming a journal for the saw shaft *n*. The yoke-like construction of this saw-carrier has a very important relation to the other parts for it allows the saw-carrier to be pivoted or have a trunnion connection *o* in the bearings *p* of the truck. At the same time the yoke bridges the electric motor M so that the armature is practically co-axial with the trunnions. Hence the tilting movement of the saw carrier has no effect upon the power transmitting belt *q* which connects the pulley *r* on the end of the armature with a driven pulley *s* on the end of the saw-shaft *n*.

Inasmuch as the saw is rotating at a very high speed and is cutting metal, numerous sparks are known and a guard is provided for the workman. This comprises a hood *t* bolted to the top of the saw-carrier by the bolts *u* and dropping down in front of the saw and provided with a leather flap *v* which can drop over the tubing and the guide *j* so as to guard the ejection of sparks at the side of the saw. The straight surface of the hood drops down to the inside of the angle iron guard *w* so that in traveling with the tiltable saw-carrier the hood and angle iron guard *w* coöperate together to prevent the throwing of sparks out at the side. *x* is a spring for returning the tiltable saw-carrier to its inactive position when the foot is released from the pedal lever *m*.

What I claim is:

1. In a machine for the purpose specified, the combination of a bed, a tiltable saw-carrier provided with a saw journaled at its top, a hood over said saw provided with a depending portion having a leather flap, and means for driving the saw.

2. In a machine for the purpose specified, a truck in which the base is under-hung, lugs upstanding from the base, wheels journaled in said lugs, trunnion bearings standing up from said base, a yoke having trunnions supported in said bearings and a portion projected out for connection with a foot pedal, a saw and saw shaft journaled at the top of the yoke, a bed supported on the truck adjacent the top of the yoke, a guide for tubing on said bed toward which the yoke is tiltable, an electric motor under the yoke and bridged thereby, the armature shaft of the motor being co-axial with the trunnions of the yoke, and belt connections between the armature shaft and saw shaft.

3. In a machine for the purpose specified, the combination of a truck including uprights supporting a bed, a yoke pivoted on the truck at the bottom and terminating at the top in a journal block, a saw journaled in said block, a hood supported on said block and shielding said saw, a motor supported on the truck under the yoke and having its armature co-axial with the pivoting of the yoke, and transmission connections between the armature shaft and the saw.

In testimony whereof, I sign this specification.

RICHARD O. BERG.